United States Patent Office 3,235,393
Patented Feb. 15, 1966

3,235,393
LIQUID COMPOSITIONS COMPRISING ORGANIC TITANIUM COMPOUNDS
Harold Garton Emblem, Grappenhall, and Charles Edward Oxley, Warrington, England, assignors to Unilever Limited, Port Sunlight, England, a company of Great Britain
No Drawing. Filed Aug. 29, 1962, Ser. No. 220,150
Claims priority, application Great Britain, Aug. 8, 1962, 30,354/62
8 Claims. (Cl. 106—38.2)

This invention relates to liquid compositions comprising organic titanium compounds.

According to the invention there is provided a liquid composition comprising an organic titanium ester of the formula $Ti(ORX)_4$, where R is an alkylene group having 2 to 4 carbon atoms and X is a chlorine, bromine or iodine atom, and an aminoalcohol of the formula $N(R^1)(R^2)(R^3)$ where $R^1$ and $R^2$ represent hydrogen, a straight chain hydroxyalkyl group having 2 to 5 carbon atoms, a branched polyhydroxyalkyl group having 4 to 5 carbon atoms, or an alkyl or aminoalkyl group having 1 to 5 carbon atoms, and $R^3$ represents a straight chain hydroxyalkyl group having 2 to 5 carbon atoms or a branched chain polyhydroxyalkyl group having 4 or 5 carbon atoms, the amount of the aminoalcohol being such that the composition is capable of forming a gel by hydrolysis. Examples of suitable aminoalcohols are monoethanolamine, diethanolamine, triethanolamine, N-methyl ethanolamine, N - (2 - aminoethyl) ethanolamine and 2-amino-2-ethyl-propan-1,3-diol. The titanium ester may be, for example, titanium tetra beta chloroethoxide $Ti(OCH_2CH_2Cl)_4$.

If there is employed an aminoalcohol having only one hydroxyl group, or an aminoalcohol having a plurality of hydroxyl groups all on the same carbon chain, then the amount of the aminoalcohol must be at least 1 mole per mole of the titanium ester. However, if the aminoalcohol contains hydroxyl groups on different carbon chains then less aminoalcohol may be used. In general the amount of aminoalcohol should be at least $1/n$ moles per mole of the titanium ester, where n is the number of the groups $R^1$, $R^2$ and $R^3$ which are hydroxyalkyl groups.

A gel can be produced from the above liquid compositions by mixing them with a solution of water in a mutual solvent for water, the ester and aminoalcohol, and then allowing the mixture to set to a gel. In some cases a solvent is not essential and the addition of water alone can cause gel formation. In those cases where a solvent is essential the water must be in a sufficient degree of dilution or otherwise no coherent gel will be formed. The amount of solvent required in order that a coherent gel may be produced is dependent on the aminoalcohol employed. Simple trial will determine suitable concentrations of water for coherent gel formation in any particular instance. The liquid composition will form a coherent gel in a time dependent on the molar proportion of the aminoalcohol relative to that of the titanium ester and on the amount of water added. When a solvent is used the gel time will also be dependent on the concentration of the water in the solvent. Suitable mutual solvents for the water, ester and aminoalcohol are the lower aliphatic alcohols, for example methanol, ethanol, normal propanol and isopropanol. If desired, some solvent may be included in the mixture of titanium ester and aminoalcohol.

The liquid compositions of the invention are suitable for use in manufacture of refractory articles for on hydrolysis coherent gels can be produced capable of binding refractory powders. The liquid compositions can thus be used in the manufacture of crucibles and also moulds for the casting of high melting point metals and alloys. Parts of moulds and cores, which are subsequently assembled to give a complete mould for casting metals or alloys, can also be produced. The liquid compositions are particularly valuable as a binder for refractory material in the manufacture of crucibles for the melting of metals and alloys.

To make refractory articles, the above liquid compositions comprising an organic titanium ester and aminoalcohol are mixed with water or a solution of water in a mutual solvent for water, the aminoalcohol and the ester, so as to cause the formation of a gel, refractory powder is added to the liquid mixture prior to gel formation, the resultant mixture is formed into the desired shape, gel formation is allowed to occur and the shape allowed to harden, whereafter the hardened shape is fired. Preferred refractories are zircon and alumina.

The following examples illustrate the invention. All parts are by weight.

Example 1

1 part of titanium tetra beta chloroethoxide (1 mol) and 1 part of monoethanolamine (6 mols) were mixed. To 10 g. of this mixture were slowly added 7 ml. of a 40% (w./w.) solution of water in isopropanol. During the addition, the mixture of titanium ester and aminoalcohol was stirred vigorously. A gel was produced in about 5 minutes.

Example 2

6 parts of titanium tetra beta chloroethoxide (1 mol) and 1 part of triethanolamine (0.4 mol) were mixed. To 10 g. of this mixture was slowly added 1 ml. of water. During the addition, the mixture of tianium ester and aminoalcohol was stirred vigorously. A gel was formed in about 5 minutes.

Example 3

5 parts of titanium tetra beta chloroethoxide (1 mol) and 4 parts of N-methyl ethanolamine (4 mols) were mixed. To 9 g. of this mixture were slowly added 3 ml. of a 60% (w./w.) solution of water in isopropanol. During the addition, the mixture of titanium ester and aminoalcohol was vigorously stirred. A gel was formed in about 5 minutes.

Example 4

3 parts of titanium tetra beta chloroethoxide (1 mol) and 1 part of N-(2-aminoethyl) ethanolamine (1.2 mols) were mixed. To 10 g. of this mixture were slowly added 4 ml. of water. During the addition the mixture of titanium ester and aminoalcohol was stirred vigorously. A gel was formed in about 5 minutes.

Example 5

50 parts of titanium tetra beta chloroethoxide (1 mol) and 19 parts of 2 - amino - 2 - ethyl-propan-1,3-diol (1.2 mols) were mixed. To 10 g. of this mixture were slowly added 7 ml. of water. During the addition the mixture of titanium ester and aminoalcohol was vigorously stirred. A gel formed in about 20 minutes.

Example 6

3 parts of titanium tetra beta chloroethoxide (1 mol) and 1 part of diethanolamine (1.2 mols) were mixed. To 25 g. of this mixture were slowly added 10 ml. of water. During the addition the mixture of titanium ester and aminoalcohol was vigorously stirred. A gel was formed in 35 minutes.

Example 7

150 g. of titanium tetra beta chloroethoxide and 50 g. of diethanolamine were mixed, in which process heat was evolved. To 25 g. of this mixture were slowly added 10 ml. of water and the mixture was stirred until clear. 150 g. of alumina powder were then added to form a slurry. This slurry was poured into a crucible mould and the moulding removed after 1 to 1½ hours. The moulding was hardened by being allowed to dry in air overnight and was then fired at 1450° C. for 8 hours to give a hard crucible.

What is claimed is:

1. A liquid composition capable of forming a gel by hydrolysis consisting essentially of
   (a) an organic titanium ester of the formula $$Ti(ORX)_4$$

where R is an alkylene group having 2 to 4 carbon atoms and X is a halogen atom selected from the group consisting of chlorine, bromine and iodine atoms, and
   (b) an aminoalcohol of the formula $N(R^1)(R^2)(R^3)$ where $R^1$ and $R^2$ represent groups selected from the class consisting of hydrogen, straight chain hydroxyalkyl groups having 2 to 5 carbon atoms, branched chain polyhydroxyalkyl groups having 4 to 5 carbon atoms, and alkyl and aminoalkyl groups having 1 to 5 carbon atoms, and $R^3$ represents a group selected from the class consisting of straight chain hydroxyalkyl groups having 2 to 5 carbon atoms and branched chain polyhydroxyalkyl groups having 4 to 5 carbon atoms, the amount of the aminoalcohol being at least $1/n$ moles per mole of the titanium ester where $n$ is the number of the groups $R^1$, $R^2$ and $R^3$ which are hydroxyalkyl groups.

2. A liquid composition as claimed in claim 1 wherein the titanium ester is titanium tetra beta chloroethoxide.

3. A liquid composition as claimed in claim 1 wherein the aminoalcohol is one selected from the group consisting of monoethanolamine, diethanolamine and triethanolamine.

4. A method of making refractory articles comprising mixing a liquid composition as claimed in claim 1 with a hydrolysing agent to cause the formation of a gel; adding a refractory powder to the mixture prior to gel formation; forming the resultant mixture into an article having a desired shape; continuing formation of said gel to bind said powder together, hardening said article; and then firing the hardened article.

5. A method as claimed in claim 4 wherein the hydrolysing agent is water.

6. A method as claimed in claim 4 wherein the hydrolysing agent is a solution of water containing a mutual solvent for water, the aminoalcohol and the ester.

7. A method as claimed in claim 6 wherein the mutual solvent is a lower aliphatic alcohol.

8. A method of producing a gel for use as a binder for refractory powders comprising hydrolysing a liquid composition as defined in claim 1.

References Cited by the Examiner

UNITED STATES PATENTS

| | | | |
|---|---|---|---|
| 2,160,273 | 5/1939 | Loane et al. | 260—429.5 XR |
| 3,056,818 | 10/1962 | Weber | 260—410.6 |

ALEXANDER H. BRODMERKEL, *Primary Examiner.*